April 16, 1968     D. J. RICKARD     3,377,947
FRUIT JUICE EXTRACTION APPARATUS AND DISK THEREFOR
Filed April 19, 1966     2 Sheets-Sheet 1
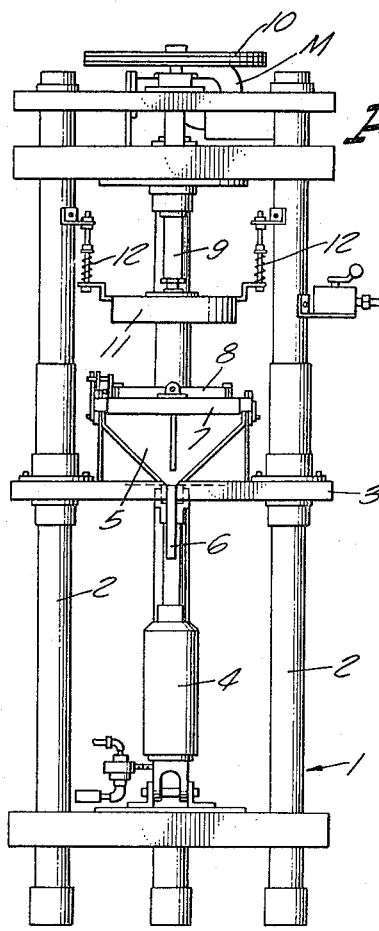
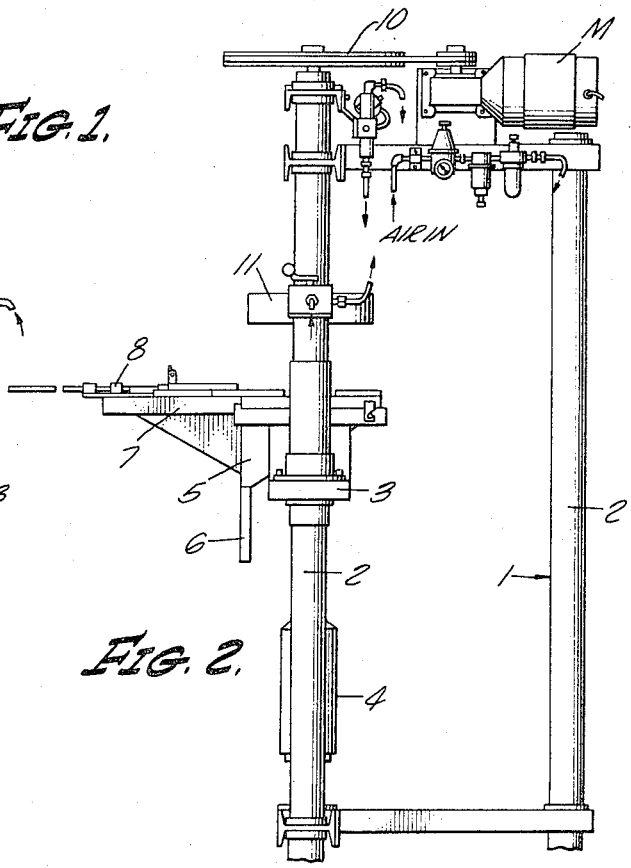
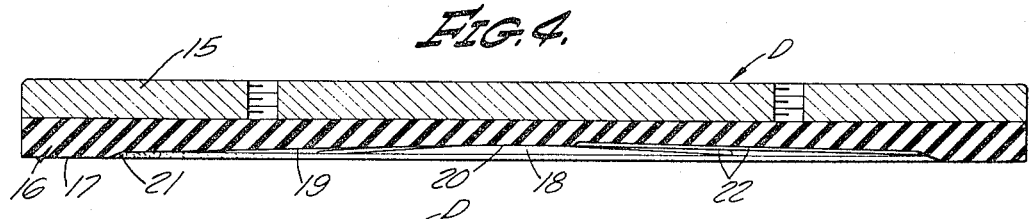
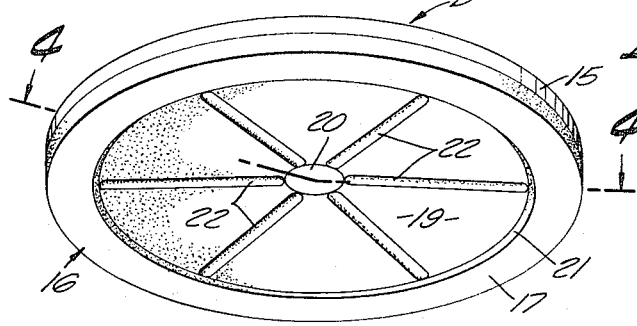
INVENTOR.
DONN J. RICKARD
BY Paul A. Weilein
ATTORNEY April 16, 1968 D. J. RICKARD 3,377,947
FRUIT JUICE EXTRACTION APPARATUS AND DISK THEREFOR
Filed April 19, 1966 2 Sheets-Sheet INVENTOR.
DONN J. RICKARD
BY
Paul A. Weilein
ATTORNEY

United States Patent Office 3,377,947
Patented Apr. 16, 1968

3,377,947
FRUIT JUICE EXTRACTION APPARATUS AND DISK THEREFOR
Donn J. Rickard, Glendora, Calif., assignor to Brown Citrus Machinery Corporation, Whittier, Calif., a corporation of California
Filed Apr. 19, 1966, Ser. No. 543,660
19 Claims. (Cl. 100—211)

ABSTRACT OF THE DISCLOSURE

Fruit juice extraction apparatus in which a non-rotatable grid plate and rotary disk are adapted to be moved towards and away from each other and to extract juice from a fruit placed between the grid and disk, the disk comprising a resilient facing formed with a peripheral portion having a radial planar surface movable into engagement with or close proximity to the grid, the peripheral portion defining a central depression having a generally concave surface extending inwardly from the peripheral portion where it merges with a bevelled wall. The center of the depression in one embodiment is flat, while in another embodiment has a resilient protuberance. The depression surface is provided with radial grooves extending from a central portion of the disk to the bevelled wall at the peripheral portion.

---

The present invention relates to fruit juice extraction apparatus and more particularly to such apparatus having an improved pressure applying rotary disk whereby to render more efficient and otherwise advantageous, the recovery of juice from citrus fruit halves.

In essence, the invention is an improvement related to citrus fruit juice extraction apparatus of the type shown in U.S. Patent No. 3,185,071, dated May 25, 1965 and in my fruit juice extraction machines as illustrated in U.S. Patent No. 3,185,072, dated May 25, 1965, and in application for Letters Patent of the United States, Ser. No. 401,815, filed Oct. 6, 1964, the invention being herein shown and described in the apparatus of the first mentioned U.S. Patent No. 3,185,071.

The prior machines as identified above are especially well suited to the extraction of juice from sample batches of citrus fruit, such as oranges for example, for the purpose of determining fruit quality in terms of juice productivity. In certain parts of the United States, the apparatus of the first mentioned U.S. Patent No. 3,185,071 is essentially the standard by which the juice content of citrus fruit is determined in respect of volume and quality, such apparatus being substantially duplicative of the squeezing operations performed manually. However, variation in the size of fruit from which juice is being extracted by machines of this type has heretofore posed a problem in the sense that larger fruit, while being subjected to a lower unit pressure than smaller fruit between the disk and a perforated grid, are nevertheless subjected to such pressure as to cause a certain objectionable abrading or shredding of the pulpy material during liberation of the juice therefrom and such pulp has been entrained in the liberated juice. On the other hand, smaller fruit are, by the prior apparatus, subjected to a relatively high unit pressure, causing substantial abrading or shredding of the pulpy material from such smaller fruit peels, so that the resultant juice contains significantly high quantities of such pulp. In addition, in such apparatus halved fruit is initially subjected to deforming pressure which tends to cause the juice to be thrown outward and flood an annular region outside of the fruit peel in which annular region the juice tends to rest and be retained by the plate or grid against which the fruit half is pressed by the disk. Adjustment of the clearance between the disk and the grid to reduce clearance outside the perimeter of the fruit merely resulted in increased abrading of the pulp. Such adjustment alone, however, did not suffice to cause all the juice flooding the grid about the fruit to be forced through the grid.

Accordingly, the present invention has as its objectives the provision of a citrus juice extraction apparatus generally corresponding to that shown in any of the above identified prior patents or application, as well as on similar types of machines which apply pressure between a relatively rotated disk and perforated grid or plate, wherein (1) the unit pressure applied to the fruit is more uniform notwithstanding variation in size so as to reduce the resultant abrading of pulp and the resultant mixing of pulp in the collected juice; (2) the disk is contoured so as to assist in leading juice to an annular region of the grid about the periphery of the fruit half; and (3) the annular region of the grid plate about the fruit half is wiped by the disk so as to cause the passage therethrough of a larger total quantity of the juice expressed from the fruit half.

In accomplishing the foregoing objectives, a number of advantages accrue, including, (1) the recovered juice has a viscosity less than the viscosity of the juice heretofore recovered by such apparatus due to the fact that there is a lesser volume of pulp material in the juice; not only is such relatively pulp-free juice of better quality, but also the reduction in viscosity enables the more accurate Brix determination by the conventional utilization of an hydrometer; and (2) the collection of a proportionally greater quantity of the sum total of the fruit, this is to say, that in terms of weight of a given batch of fruit, the combined weight of the spent peel and the recovered juice more nearly equals the total original weight of the sample of fruit being juiced.

In brief, the invention specifically employs a grid plate and a relatively rotatable disk which, as in the case of the prior machines, are relatively moved so as to engage and apply pressure to the fruit half while effecting rotation of the cut face of the fruit half against the grid plate, but wherein the disk is so constructed that it has an outer peripheral portion which will circumscribe the cut fruit half and cause the displacement through the grid of such juice as is caused to flow to the annular region of the grid plate outside the fruit half, while the fruit half itself is engaged by a recessed face of the disk which in a specific embodiment is generally concave and is provided with surfaces which apply a more nearly uniform pressure across the extent of various size fruit, this concave face, moreover, providing a downward and outward component for flow of free juice which, combined with centrifugal force due to disk rotation, leads the juice outwardly to the aforementioned annular region of the grid plate.

Other objects and advantages of the invention will be hereinafter described or will become apparent to those skilled in the art, and the novel features of the invention will be defined in the appended claims.

In the accompanying drawings:

FIG. 1 is a front elevation of a citrus fruit juice extracting machine incorporating the present invention;

FIG. 2 is a side elevation of the machine of FIG. 1;

FIG. 3 is a perspective view more particularly illustrating the bottom of the pressure applying rotary disk of the machine;

FIG. 4 is a view in transverse section as taken on the line 4—4 of FIG. 3;

Like reference characters in the several views of the drawings and in the following description designate corresponding parts.

Figure 5:
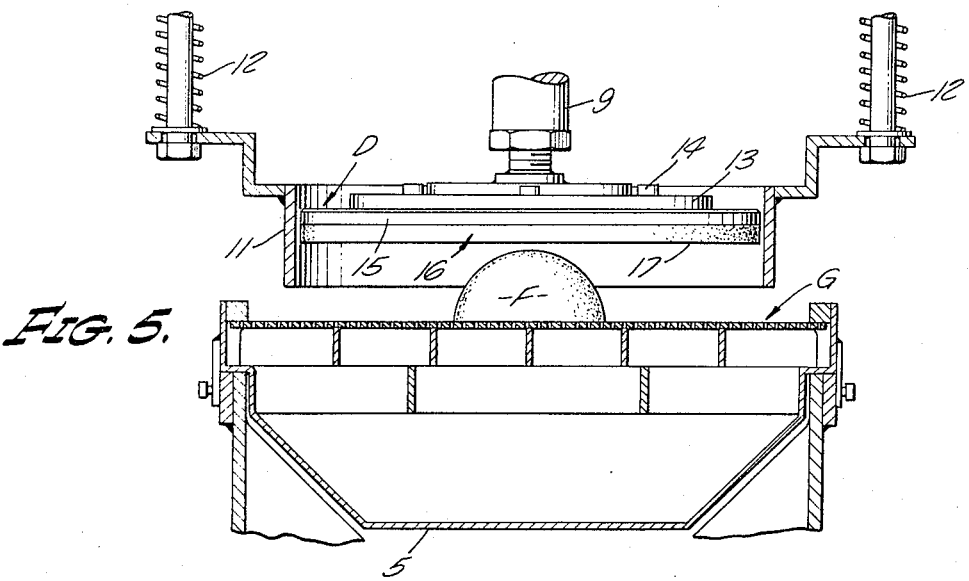
FIG. 5 is a fragmentary view in vertical section and on an enlarged scale through the fruit half supporting grid and pressure applying disk assemblages, the disk and grid being separated.

Referring first to FIGS. 1 and 2, there is generally shown a fruit juice expressing machine of the type in which a grid and rotary disk are moved toward one another to apply juice extracting pressure to a fruit half disposed therebetween. This machine is described in detail and more particularly illustrated in the above identified U.S. Patent No. 3,185,071, to which reference may be made for the details of construction.

In general, the machine comprises a supporting framework 1 including a pair of transversely spaced posts or columns 2 on which is slidably mounted a support 3 whereby the support may be elevated and lowered by means of a fluid pressure actuated cylinder 4. Mounted on the support 3 is a juice receiver 5 having a discharge outlet 6. Disposed above the receiver 5 is a horizontal table 7 adapted to have placed thereon cut fruit halves which may be transferred by a positioning mechanism 8 to a location axially aligned with a rotary shaft 9. This shaft is adapted to be driven by a motor M through a belt and pulley drive 10 at a desired rate of speed. Also mounted on the posts 2 is an annular shield or guard 11 which is biased by springs 12 downwardly to the position shown in FIGS. 1 and 2.

Figure 6:
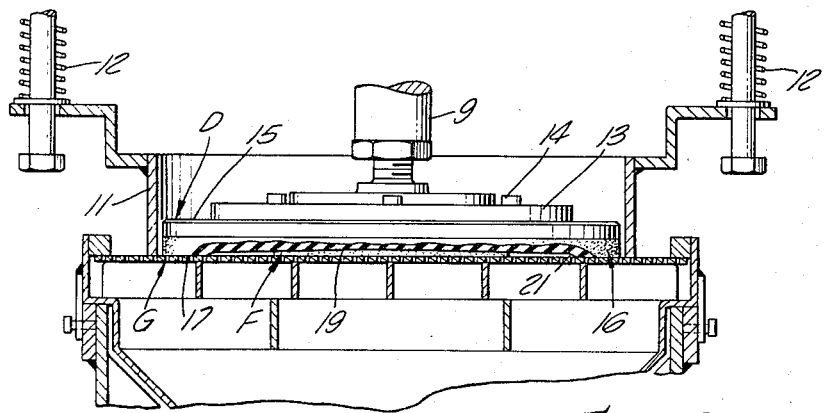
FIG. 6 is a fragmentary detail view in vertical section corresponding to FIG. 5 but showing the fruit half pressed between the grid and the disk.

Referring to FIG. 5, it will be noted that the annular shield 11 is disposed about the outer periphery of a disk generally denoted at D which is suitably supported at the lower end of the shaft 9 so as to be rotatively driven by the latter. Disposed beneath the disk D so as to receive fruit halves moved from table 7 by the positioning mechanism 8, and in overlying relation to the receiver 5, is a grid plate generally denoted at G which is customarily provided with a large number of small perforations through which juice may flow when a fruit half F is subjected to pressure between disk D and grid G responsive to movement of the disk and grid towards one another, as shown in FIG. 6. In the apparatus herein illustrated, such movement of disk D and grid G one toward the other is effected by an actuator cylinder 4 which will cause the support 3 to move upwardly.

It will also be noted that as is customary, the annular shield 11 engages the grid G and is displaced by the latter against the bias of springs 12 so as to define a cylindrical chamber in which the disk G operates to cause rotation of the fruit half F as the pressure is applied thereto. This shield 11, inasmuch as it normally extends below the lower face of disk D, will initially contact the grid G so as to provide a barrier which will limit to the circular space within the shield the forceful outward expulsion of juice from the fruit half F as it is being deformed under pressure. Thereafter, as the disk D rotates the cut face of the fruit half F will be moved rotatively relative to the grid G as pressure is progressively applied and the juice will be forced through the grid G beneath the fruit.

In accordance with the present invention, the disk D has a structure which will now be described.

Disk D is adapted to be attached to a plate 13 at the lower end of shaft 9 by means of fasteners 14. Referring to FIGS. 3 and 4, the disk D is shown as comprising a supporting or backing plate 15 of suitable rigid construction adapted to receive the fasteners 14 and on which a rubber or rubber-like facing 16 is secured as by bonding. This facing material is preferably resiliently deformable and, for example, would have a shore on the order of 45 durometer. The resilient facing 16 of the disk D is formed with an annular outer peripheral planar portion 17 which extends about or defines a central depression 18.

The lower face of the disk facing 16 which forms the depression is generally concave but more particularly the concavity is provided by a face 19 which is frusto-conical. This frusto-conical face 19 joins at the center of the disk facing 16, in the illustrative embodiment now being described, with a central circular flat or planar face 20. At the outer extreme of the conical face 19 it merges with an annular bevelled wall 21 which extends inwardly from the outer peripheral portion 17. Formed in the frusto-conical face 19 and, as specifically illustrated, extending between the central flat portion 20 and the bevelled wall 21 is a suitable number of radial grooves 22 which constitute means for enhancing the traction of the disk with the fruit.

In practice, it has been found that in respect of a disk D having a diameter of ten inches, the desired results have been accomplished by the utilization of a facing 16 in which the outer peripheral portion 17 has an inside diameter of approximately eight inches and the central flat face 20 has a diameter of approximately one inch and wherein the axial dimension between the peripheral portion 17 and the flat face 20, i.e., the depth of the concavity is about one-eighth inch. It will be understood that the above dimensions are representative of an example and other precise forms and dimensions may be employed to provide the concavity.

It will now be recognized that in the use of the apparatus the positioning means 8 will function to move a cut fruit half F to a position, as shown in FIG. 5, axially aligned with the disk D and with its cut face resting on the grid G. Operation of the actuator cylinder 4 and the motor M with its pulley drive 10 will cause relative movement of the disk and grid one toward the other as well as relative rotation, so that the fruit half F will be subjected to axial deforming pressure and rotation against the grid G. Initial deformation of the fruit half F, as indicated hereinabove, will cause the energetic expulsion of juice from beneath the fruit half F in an outward direction and such juice will impinge upon the shield 11 which is in engagement with the grid G, so that such juice will be confined to an annular region lying outside of the perimeter of the fruit half and within the shield 11. While in the use of previous machines as described above the juice in such annular region remains on the grid G due to the presence of pulp in the juice and due to surface tension of the juice, the present disk D will cause the major portion of such juice in this annular region to be displaced through the grid perforations, since, as seen in FIG. 6, the annular outer peripheral portion 17 of the disk is ultimately moved into face-to-face contact with the grid G or, depending upon the adjustment of the machine, into slightly spaced relation to the grid G, but in any event, into such close proximity as to agitate the ring of juice through the grid perforations.

Juice which may tend to cling to the undersurface of the disk D will flow downwardly and outwardly to the bevelled surface 21 and thence down the bevelled surface 21 to the outer peripheral portion 17 due to the concavity of the underface and due to centrifugal force, and in a direction towards the grid whereby to enhance the collection of the maximum available juice from the fruit half, this being a distinct advantage over the prior art devices.

In addition, it will be appreciated that inasmuch as the concavity provided by the frusto-conical face 19 progressively recedes from the grid, the disk will have a more uniform pressure effect on different sizes of fruit, whereas in the case of prior disks there was a variation in unit pressure which was a function of the size of the fruit. In the case of the present disk, the pressure is more uniform over the entire range of fruit sizes and a greater volume of juice is collected while the clearance between the disk and the grid in the region of the fruit half is maintained so as to minimize the abrading of the pulp.

The result of such a construction, as pointed out at the commencement hereof, is that the pulpy material will not be abraded by the grid plate G to such an extent as to cause the entrainment of substantial quantities of abraded pulp material in the liberated juice. Thus, not only is occlusion of the grid perforations minimized, but also the collected juice will be of comparatively low viscosity, thereby enabling a rapid Brix determination by the conventional use of an hydrometer.

Figure 7:
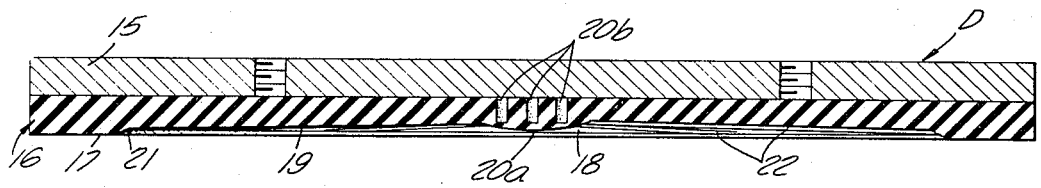
FIG. 7 is a view corresponding to FIG. 4 showing a modified disk construction.

Referring now to FIG. 7, there is illustrated a modified form of disk facing 16 which, like that previously described, is bonded or otherwise suitably supported by the supporting or backing plate 15 and which in most respects corresponds in detail to the facing shown in FIGS. 3 and 4. However, in FIG. 7 it will be noted that at the center of the concavity in the region occupied by the flat central face 20 of FIGS. 3 and 4, there is provided a convex protuberance 20a. The facing material 17 is relieved within this protuberance as at 20b by the formation of a suitable number of pockets so that the protuberance may be readily resiliently deformed. The formation 20a will have no real bearing on the juice extraction function of the disk facing 16 but does provide means operable upon movement of the disk D and grid G relatively apart to discharge or displace the spent peel from the concavity. This protuberance 20a is thus characterized as resiliently deformable means centrally of the generally concave face of the disk for applying ejection force to a fruit peel.

From the foregoing it will now be apparent that the various objectives and advantages ascribed to the present invention as well as others are accomplished, and while the specific details have been shown and described, it should be understood that changes and alterations may be resorted to without departing from the spirit of the invention as defined in the appended claims.

I claim:
1. In fruit juice extraction apparatus, comprising: a grid plate; a rotary disk; means supporting said grid plate and said disk for movement one toward and away from the other; actuator means for effecting such movement; means for effecting rotation of said disk; the improvement wherein said disk is provided with an annular outer peripheral portion defining a central depression; and said actuator means being operable to move said outer peripheral portion and said grid plate into close proximity during rotation of said disk with the central depression thereof spaced from the grid plate a greater distance than said peripheral portion.

2. Apparatus as defined in claim 1, wherein said disk is provided with a generally shallow concave face within said peripheral portion.

3. Apparatus as defined in claim 1, wherein said disk is provided with a relatively shallow frusto-conical face within said peripheral portion.

4. Apparatus as defined in claim 1, wherein said disk is provided with a bevelled wall extending inwardly from said outer peripheral portion; and a generally shallow concave face merging with said bevelled wall.

5. Apparatus as defined in claim 1, wherein said disk is provided with a generally concave face within said peripheral portion; and resiliently deformable means supported centrally of said generally concave face for applying ejection force to a fruit peel.

6. Apparatus as defined in claim 5, wherein said resiliently deformable means comprises a protuberance on said disk; said protuberance being resiliently deformable.

7. Apparatus as defined in claim 1, wherein said disk is provided with a generally concave face within said peripheral portion and said face having a plurality of grooves extending generally radially therein and leading to said peripheral portion.

8. Apparatus as defined in claim 1, wherein said disk is provided with a bevelled wall extending inwardly from said outer peripheral portion, a frusto-conical face merging with said bevelled wall, and a central flat surface.

9. Apparatus as defined in claim 1, wherein said disk is provided with a bevelled wall extending inwardly from said outer peripheral portion, a frusto-conical face merging with said bevelled wall, and a central flat surface, said frusto-conical face having therein a plurality of grooves leading to said bevelled wall.

10. Apparatus as defined in claim 1, wherein an annular shield is disposed about said disk and including means supporting said shield for engagement with said grid plate upon movement of said grid plate and said disk one toward the other.

11. A pressure disk for use in fruit juice extraction apparatus, comprising: a rigid backing plate; a resilient face on said backing plate; and said facing being provided with an annular outer peripheral portion defining a central depression, said peripheral portion having a radial planar surface, and said depression extending inwardly from said peripheral portion.

12. A pressure disk as defined in claim 11, wherein said facing in said depression is provided with a generally concave face within said peripheral portion.

13. A pressure disk as defined in claim 11, wherein said facing in said depression is provided with a frusto-conical face within said peripheral portion.

14. A pressure disk as defined in claim 11, wherein said facing is provided with a bevelled wall extending inwardly from the planar surface of said outer peripheral portion, and a generally concave facing in said depression merging with said bevelled wall.

15. A pressure disk as defined in claim 11, wherein said facing is provided with a generally concave face within said peripheral portion; and resiliently deformable means secured centrally of said generally concave face for applying ejection force to a fruit peel.

16. A pressure disk as defined in claim 15, wherein said resiliently deformable means comprises a protuberance on said disk, said protuberance being resiliently deformable.

17. A pressure disk as defined in claim 11, wherein said disk is provided with a generally concave face within said peripheral portion, and said face having a plurality of grooves extending generally radially therein and leading to said peripheral portion.

18. A pressure disk as defined in claim 11, wherein said disk is provided with a bevelled wall extending inwardly from said outer peripheral portion, a frusto-conical face merging with said bevelled wall, and a central flat surface.

19. A pressure disk as defined in claim 11, wherein said disk is provided with a bevelled wall extending inwardly from said outer peripheral portion, a frusto-conical face merging with said bevelled wall, and a central flat surface, said frusto-conical face having therein a plurality of grooves leading to said bevelled wall.

References Cited

UNITED STATES PATENTS

| | | | |
|---|---|---|---|
| 2,018,932 | 10/1935 | Thorne | 100—238 X |
| 2,486,947 | 11/1949 | Hilger | 51—356 |
| 2,556,434 | 6/1951 | Mitchell | 51—356 |
| 2,723,618 | 11/1955 | Matthews | 100—213 X |
| 3,185,071 | 5/1965 | Foss et al. | 100—53 |
| 3,307,502 | 3/1967 | Armour | 107—15 |

BILLY J. WILHITE, *Primary Examiner.*